United States Patent Office 2,941,996
Patented June 21, 1960

2,941,996
12α-HALO PREGNANES

Burton G. Christensen, Rahway, John M. Chemerda, Metuchen, and Ralph F. Hirschmann, Scotch Plains, N.J., assignors to Merck & Co., Inc., Rahway, N.J., a corporation of New Jersey No Drawing. Filed Nov. 27, 1957, Ser. No. 699,174

4 Claims. (Cl. 260—239.55)

This invention is concerned generally with novel steroid compounds and with processes of preparing the same. More particularly, it relates to 12α-halo-11β-hydroxy-4-pregnene-3,20-dione and novel chemical compounds produced as intermediates in the synthesis of 12α-halo-11β-hydroxy-4-pregnene-3,20-dione.

The 12α-halo-11β-hydroxy-4-pregnene-3,20-dione compounds possess marked and enhanced anti-inflammatory activity compared with the non-halogenated analogues, and are especially effective for the treatment of arthritis and related diseases.

In preparing the novel chemical compounds of the present invention, the starting material utilized is 3α-acyl-12α-halo-pregnane-11,20-dione which may be represented by the following structural formula—

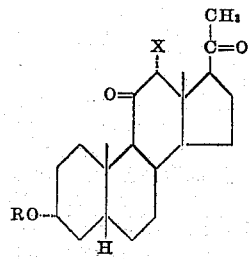

wherein R is an acyl group and X is halogen.

The 3α-acyl-12α-halopregnane-11,20-dione starting material is hydrolyzed under acid conditions without displacing the reactive halogen at the 12-position to form 12α-halo-3α-hydroxy-pregnane-11,20-dione which has the structural formula—

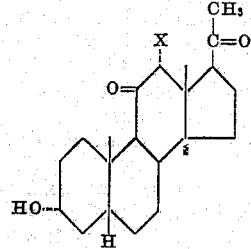

wherein X is as above.

Reaction of the 12α-halo-3α-hydroxy-pregnane-11,20-dione with an oxidizing agent such as N-bromoacetamide, N-bromosuccinimide, chromium trioxide in pyridine, or an alkali metal chromate in acetic acid results in the formation of 12α-halo-3,11,20-pregnane-trione, a compound having the following formula—

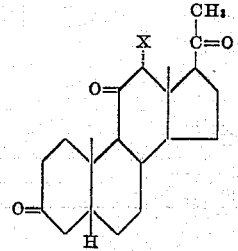

wherein X is as above.

The 12α-halo-3,11,20-pregnanetrione obtained as above is reacted with ethylene glycol in the presence of an acid catalyst such as para-toluenesulfonic acid, sulfosalicyclic acid, and chlorosulfonic acid to form 12α-halo-3,11,20-pregnanetrione cyclic 3,20-bis-ethylene-ketal a compound which may be represented by the following structural formula—

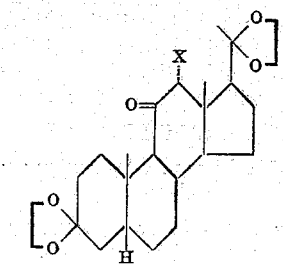

wherein X is as above.

Reaction of the 12α-halo-3,11,20-pregnanetrione-3,20-bis-ethylene ketal with lithium borohydride results in the formation of 12α-halo-3,20-diketo-11β-pregnanol-3,20-bis-ethylene ketal a compound having the following formula—

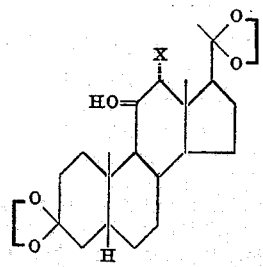

wherein X is as above. Since the halogen in the 12-position in the above compound is unstable, it is surprising that the keto in the 11-position can be converted to hydroxy without disturbing the 12-position halogen.

The 12α-halo-3,20-diketo-11β-pregnanol-3,20-bis-ethylene ketal thus obtained is then reacted with a base such as potassium hydroxide in isopropyl alcohol to form 11β,12β-epoxy-3,20-pregnanedione-3,20-bis-ethylene ketal which may be represented by the formula—

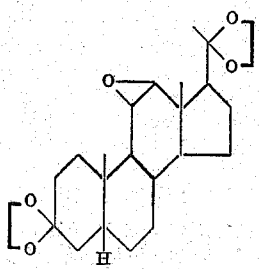

Treatment of the 11β,12β-epoxy-3,20-pregnanedione-3,20-bis-ethylene ketal with acid in an inert solvent such as dioxane, and neutralizing the mixture with sodium bicarbonate results in the formation of the 12α-halo-11β-hydroxypregnane-3,20-dione which can be represented by the following formula—

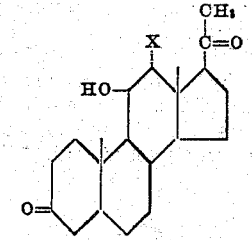

The 12α-halo-11β-hydroxypregnane-3,20-dione is reacted with bromine in acetic acid to form 4-bromo-12α-halo-11β-hydroxypregnane-3,20-dione. Dehydrobromination of the latter compound by means of lithium chloride in dimethylformamide results in the formation of 12α-halo-11β-hydroxy-4-pregnene-3,20-dione. This latter compound has been found to possess marked anti-inflammatory activity.

The following experimental part illustrates in detail some of the compounds which constitute this invention and methods for their production. However, this invention is not to be construed as limited thereby in spirit or in scope since it will be apparent to those skilled in the art that many modifications in materials and methods may be made without departing from the invention.

EXAMPLE 1

*Preparation of 12α-bromo-3α-hydroxypregnane-11,20-dione*

50 g. of 3α-acetoxy-12α-bromopregnane-11,20-dione, 5.18 liters of methanol and 51.8 ml. of concentrated hydrochloric acid were stirred for 20 hours at about 20° C. The reaction was quenched by adding a solution of 27.6 g. of sodium bicarbonate in 690 ml. of water with stirring. The product, 12α-bromo-3α-hydroxypregnane-11,20-dione, was isolated by removing the methanol in vacuo, adding 1 liter of water and filtering; M.P. 157–159° C.; wt. 44.9 g. (82%).

*Preparation of 12α-bromo-3,11,20-pregnanetrione*

39.78 g. of 12α-bromo-3α-hydroxypregnane-11,20-dione were dissolved in 971 ml. of methanol and 9.71 ml. of dry pyridine were added. The flask was covered with a black cloth and continuously stirred at about 20° C. A solution of 75.7 g. N-bromoacetamide in 971 ml. of methanol was added and the mixture was stirred for 20 hours. Twenty milliliters of allyl alcohol were added, followed by 3 liters of water. The product 12α-bromo-3,11,20-pregnane-trione which crystallized on standing was filtered off; M.P. 189–191° C.; wt. 38.43 g. (86%).

*Preparation of 12α-bromo-3,11,20-pregnanetrione-3,20-bis-ethylene ketal*

A solution of 39.98 g. of 12α-bromo-3,11,20-pregnanetrione, 1.075 g. of p-toluenesulfonic acid monohydrate, 24.6 ml. of freshly distilled ethylene glycol and 924 ml. of benzene, that had been previously dried over sodium, was slowly distilled through a Vigreux column for 5 hours, keeping the volume constant by adding dry benzene. The reaction mixture was extracted twice with 5% sodium bicarbonate solution and washed once with water. It was dried over anhydrous sodium sulfate for about 16 hours, filtered and the filtrate concentrated in vacuo. The product 12α-bromo-3,11,20-pregnanetrione-3,20-bis-ethylene ketal was crystallized from acetone-methanol; M.P. 173–175° C., wt. 34.87 g. (72%).

*Preparation of 12α-bromo-3,20-diketo-11β-pregnanol-3,20-bis-ethylene ketal*

Ten grams of 12α-bromo-3,11,20-pregnanetrione-3,20-bis-ethylene ketal were dissolved in 300 ml. of tetrahydrofuran and cooled to 0° C. The system was purged with nitrogen. A filtered solution of 8 g. of lithium borohydride in 600 ml. of tetrahydrofuran was added over a period of 45 minutes with stirring. The solution was allowed to come to room temperature slowly and was stirred at room temperature for three hours. A solution of 22 ml. of glacial acetic acid in 116 ml. of water was added. The tetrahydrofuran was removed in vacuo and 200 ml. of water added. The aqueous layer was extracted three times with chloroform and the combined organic extracts were washed with 5% sodium bicarbonate and water and dried over anhydrous sodium sulfate overnight. It was filtered and the filtrate concentrated in vacuo; wt. 8.72 g. of a clear oil (87%), 12α-bromo-3,20-diketo-11β-pregnanol-3,20-bis-ethylene ketal was recovered.

*Preparation of 11β,12β-epoxy-3,20-pregnanedione-3,20-bis-ethylene ketal*

To a solution of 19.5 g. of potassium hydroxide in 325 ml. isopropanol, 6.51 g. of 12α-bromo-3,20-diketo-11β-pregnanol-3,20-bis-ethylene ketal were added and the system was purged with nitrogen. The reaction mixture was stirred for 1½ hours at 55° C. and during this time a copious precipitate of potassium bromide formed. The reaction mixture was poured into the water, and was back-extracted three times with ether. The ether was back-extracted with water and dried over anhydrous sodium sulfate overnight. Filtered and concentrated in vacuo to a small volume; the resultant needles of 11β,12β - epoxy - 3,20 - pregnanedione - 3,20 - bis - ethylene ketal were filtered off; M.P. 128–130° C., wt. 3.16 g. (58%).

*Preparation of 12α - chloro-11β-hydroxypregnane-3,20-dione*

A solution of 1.0 g. of the 11β,12β-epoxy-3,20-pregnanedione-3,20-bis-ethylene ketal in 75 ml. of a dioxane solution containing 25 ml. of 2.4 N hydrochloric acid was allowed to stand for three hours at room temperature and then was heated at 60° C. for an additional three hours. A cold, saturated solution of sodium bicarbonate was added to neutralize the acid. The dioxane was removed in vacuo on the hot water bath and the aqueous phase was extracted three times with chloroform. The chloroform extracts were washed once with water and dried over anhydrous sodium sulfate for one hour before filtering and concentrating the filtrate to dryness in vacuo on the hot water bath. The product was purified to give material melting at 239–243° C.

*Preparation of 12α-chloro-11β-hydroxyprogesterone*

12α-chloro-11β-hydroxy-pregnane-3,20-dione obtained as above was reacted with bromine in acetic acid to form 4-bromo-12α-chloro-11β-hydroxypregnane-3,20-dione. This latter compound was dehydrobrominated by means of lithium chloride in dimethylformamide to form 12α-chloro-11β-hydroxy-4-pregnene-3,20-dione.

Various changes and modifications may be made in the present invention, certain preferred embodiments of which are herein disclosed, without departing from the scope thereof; to the extent that these changes and modifications are within the scope of the appended claims, they are to be considered as part of this invention.

We claim:

1. 12α - bromo - 3,11,20-pregnanetrione-3,20-bis-ethylene ketal having a melting point of about 173–175° C.

2. 12α - bromo - 3,20-diketo-11β-pregnanol-3,20-bis-ethylene ketal.

3. 11β,12β - epoxy - 3,20-pregnanedione-3,20-bis-ethylene ketal having a melting point of about 128–130° C.

4. The process which comprises reacting 12α-bromo-3,11,20-pregnanetrione-3,20-bis-ethylene ketal with lithium borohydride to form 12α-bromo-3,20-diketo-11β-pregnanol-3,20-bis-ethylene ketal.

References Cited in the file of this patent

UNITED STATES PATENTS

| | | |
|---|---|---|
| 2,554,882 | Reichstein | May 29, 1951 |
| 2,737,512 | Bernstein et al. | Mar. 6, 1956 |
| 2,773,060 | Levin et al. | Dec. 4, 1956 |
| 2,782,211 | Wettstein et al. | Feb. 19, 1957 |
| 2,810,734 | Herzog et al. | Oct. 22, 1957 |
| 2,851,470 | Diassi et al. | Sept. 9, 1958 |